United States Patent [19]

Gabaldon

[11] Patent Number: 4,758,931
[45] Date of Patent: Jul. 19, 1988

[54] VEHICLE LIGHT SYSTEM

[76] Inventor: Joe Gabaldon, P.O. Box 414621, Miami Beach, Fla. 33141

[21] Appl. No.: 39,710

[22] Filed: Apr. 20, 1987

[51] Int. Cl.⁴ .............................................. B60Q 1/00
[52] U.S. Cl. ...................................... 362/61; 340/74; 340/97; 362/241
[58] Field of Search .................. 362/61, 80, 237, 241, 362/249, 238; 340/93, 97, 69, 74

[56] References Cited

U.S. PATENT DOCUMENTS 4,574,269  3/1986  Miller ...................................... 340/97
4,602,320  7/1986  Tomkin et al. ........................ 362/80
4,682,146  7/1987  Friedman ............................... 340/97

Primary Examiner—Charles J. Myhre
Assistant Examiner—David A. Okonsky
Attorney, Agent, or Firm—Richard C. Litman

[57] ABSTRACT

A high-visibility, rear-end, light assembly for automobiles or similar vehicles which borders the perimeter of the rear window of the vehicle. The system performs all the functions required by government standards. It can either replace other rear-end light systems or supplement existing light systems. The perimeter configuration of the present invention does not create a protruding, visual obstruction in the rear-window area.

4 Claims, 1 Drawing Sheet

VEHICLE LIGHT SYSTEM

BACKGROUND OF THE INVENTION

The present invention relates to a vehicle-safety, rear-lighting assembly. More particularly, the present invention relates to a vehicle-safety, rear-lighting assembly with a structural configuration that provides numerous improvements over existing rear-lighting systems. The present rear-lighting system provides a more conspicuous and visible lighting and signalling arrangement which does not obstruct the operator's view through the rear window in any significant manner. Furthermore, since the present rear-lighting system is situated within the interior of the vehicle, it is protected from damage that can sometimes be caused by road debris, minor collisions (i.e., "fender benders"), and the like.

The present rear-end, lighting system, to be described herein in full detail, is mounted flush against the inside perimeter of the rear window. This peripheral light arrangement creates a larger lighted area that does not obstruct the rear-window view and substantially increases the visibility of the lighting system for other drivers. Furthermore, the particular arrangement of each of the individual signalling elements in the system enables one to recognize each signal quicker.

The bright, red lights across the top and bottom of the window are used for braking. Flashing, amber-lighting elements, on the left or right side of the window, signify that a turn is to be made in the direction (left or right) indicated by the flashing element. The white lights below each of the turn signals notify approaching traffic, or the like, that the vehicle is in reverse gear. Since the braking and tail lights are mounted across the top and bottom of the rear window while the turn signals are mounted on the sides, more attention is directed to the different signals when they are on. The separated positioning of the signals leaves little chance that they might be confused for each other. This improved lighting arrangement conforms to accepted standards and provides greater visibility due to its arrangement and increased lighted area.

DESCRIPTION OF PRIOR ART

Various relevant prior art lighting and signalling systems, and the like, as well as apparatus and method of their construction in general, are found to be known and exemplary in the following U.S. prior art:

| | |
|---|---|
| 4,600,913 | H. A. Caine |
| 4,449,167 | R. Cohen |
| 4,149,141 | K. Tanimura |

Caine discloses a collision avoidance device which, although it is elevated to eye level, does not generate the perceptibility of the present invention. Caines's collision avoidance device has less lighted area, creates a visual obstruction in the middle of the rear window, and does not exhibit the eaxy-to-see and understand signal arrangement of the present invention. In addition, with the embodiment of Caine's collision avoidance device where it is situated on the exterior of an automobile, Caine's device, or any similar device, is subject to the hazards of the environmental elements.

U.S. Pat. No. 4,449,167 to Cohen and U.S. Pat. No. 4,149,141 to Tanimura are each for vehicle-lighting assemblies. Both of these light assemblies also fail to provide the unobstructed view or the increased signal- and tail-light area of the present invention.

Moreover, all three of the above listed inventions further prove themselves inferior to the present invention in their failure to prevent the reflection of glare and the scattering of light back into the interior of the vehicle.

These patents, or known prior uses, reveal various types of rear-end, lighting systems of various manufactures and methods of their construction, but none of them, whether taken singularly or in combination, discloses the specific details of the present invention in such a way as to bear upon the claims of the present invention to be disclosed herein.

DESCRIPTION OF THE PREFERRED EMBODIMENT(S) AND BEST MODE

Figure 1:
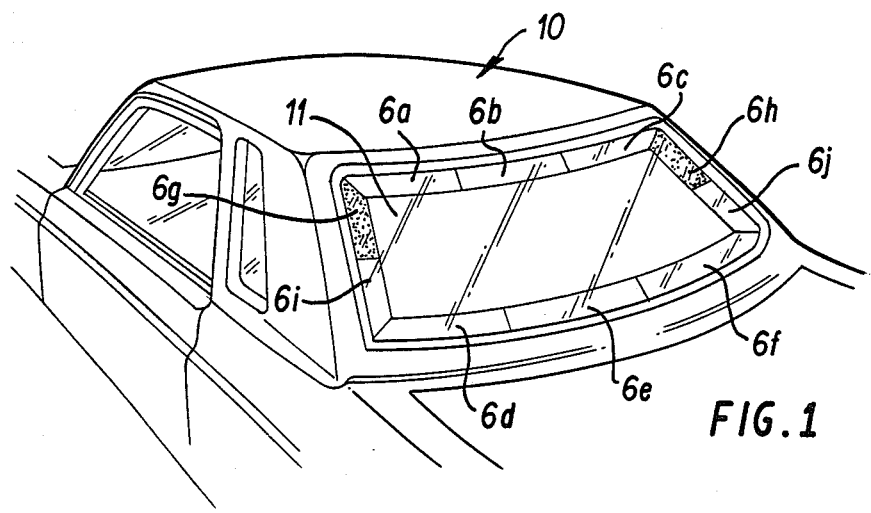
FIG. 1 is a perspective view of the ultra-safe, rear-end, lighting assembly installed in a vehicle.

Referring to FIG. 1, there is shown in its preferred embodiment the highly-visible, rear-end, lighting assembly of the present invention mounted about the perimeter of the rear window 11 of the automobile 10. The uppermost-horizontal portion 6a–6c is a stop signal which is lighted when the brake pedal is depressed. The lower-horizontal portion 6d–6f is a combination stop signal and tail light. This portion is lighted red when the parking lights and head lights are turned on; but it also lights when the brakes are applied. In the event the tail lights are on while the brake pedal is applied, the lower-horizontal portion of the light assembly 6d–6f illuminates with greater intensity for the duration of time that the brake pedal is depressed. Therefore, when the brake pedal is depressed, both the upper-horizontal portion 6a–6c and the lower-horizontal portion 6d–6f are illuminated simultaneously, providing an extremely visible and distinguishable braking signal. The upper portions of both the left and right sides 6g and 6h indicate when the vehicle 10 is turning. Amber-colored, lightable area 6g flashes off and on repeatedly to indicate when the vehicle 10 is turning left. Likewise, amber-colored, lightable area 6h flashes off and on repeatedly to indicated that the vehicle 10 is turning right. When the vehicle 10 is not turning, area 6g and 6h remain unlighted. Both lightable areas 6g and 6h flash together simultaneously when the hazard indicator is turned on.

Beneath each of the turn indicators 6g and 6h are situated two lightable portions 6i and 6j. These lightable areas 6i and 6j emit white light when the vehicle is placed in reverse gear.

The lightable area 6a–6j is electrically connected to the vehicle by wires and circuitry (not shown) which are well known and understood by those skilled in the art. The lightable area may be illuminated, in response to the driver's actions or desires, by means as simple as a light bulb or as complex as an light emitting diode (LED) readout. Since such illumination means are not a part of the present invention and are well understood by those skilled in the art, they will not be described in any detail herein.

Figure 2:
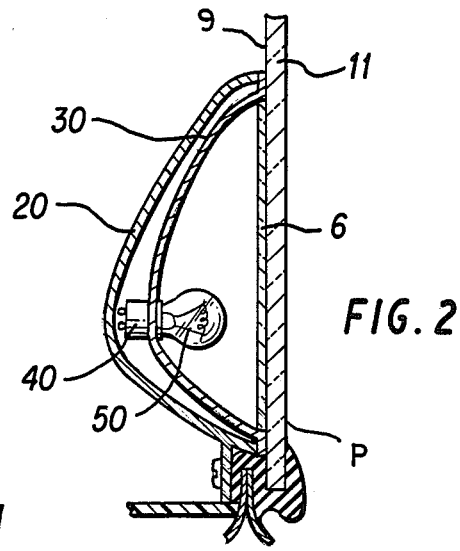
FIG. 2 is a cross-sectional view of a portion of the installed lighting assembly.
Figure 3:
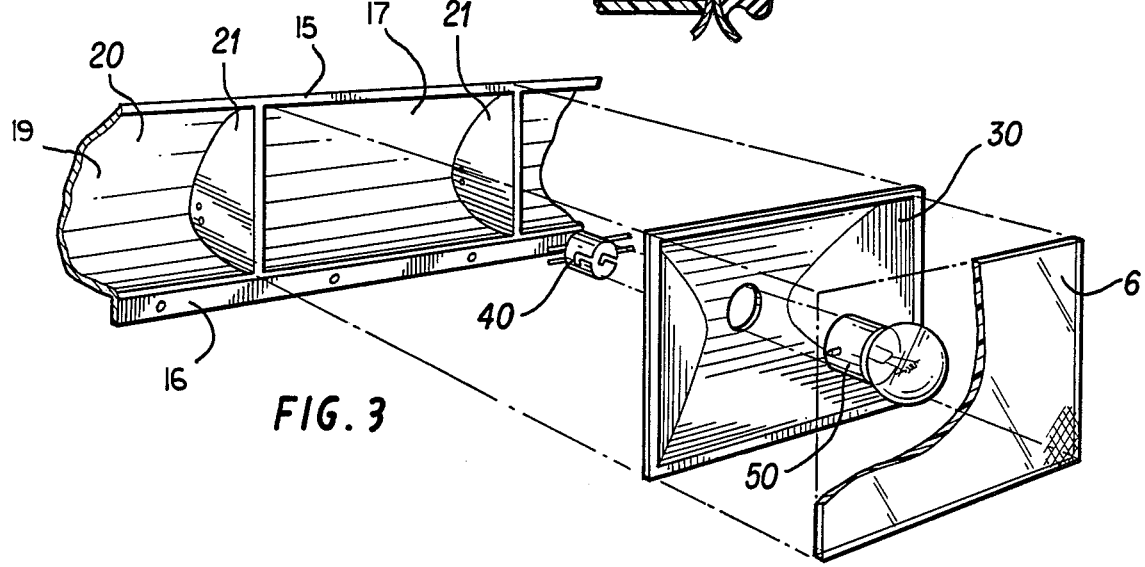
FIG. 3 is a perspective exploded view of a portion of the lighting assembly prior to installation.

FIG. 3 shows a section of one embodiment of the present invention, exploded to reveal its construction. In its preferred embodiment, a molded, or otherwise manufactured, casing 20 houses the internal elements of the present device. The casing is substantially elongated, having a concave cross-sectional area configuration constructed to provide adequate space between the inner surface of the rear window 11 and the inside surface of the casing frame 20 to house all internal elements of the device. This housing is built as part of the automobile's rear-window frame, or it is otherwise a separate assembly attached by metal screws, welding, and the like, as shown in FIG. 2 and FIG. 3. The casing 20, as shown in FIG. 3, has a plurality of periodically-spaced, perpendicular-planar panels 21 along its length which partition the length of the recessed side of the casing into multiple, separate-lighting units. Each unit has within it a reflective element 30, one or more lighting elements 50, and its associated electrical hardware 40. A lens 6, which is appropriately colored for the signalling function of the corresponding lighting unit or units, is fastened in place over the recess provided by the casing. One lens may cover one or more of the individual lighting units. Each lens 6 fits over the open cavity of the casing 20, without protruding beyond the edges of said casing.

Referring to FIG. 2, there is shown a cross-sectional view of a portion of the lighting assembly which discloses the way the assembly is mounted flush against the interior surface of the rear window 10 at its outer edges. Since the present invention is attached around the border of the window 11, it does not create a protruding visual obstruction, but it does create a highly-visible and discernable, rear-end, lighting system.

While various changes may be made in the detail construction, it is understood that such changes will be within the spirit and scope of the present invention, as is defined by the appended claims.

What is claimed is:

1. A high-visibility lighting system for attachment to the perimeter of the inner surface of an automobile's rear window having a frame and adapted to be connected to existing electrical wiring of an automobile to replace or supplement the original lighting system of the automobile comprising;

a molded or similarly manufactured casing of rigid material disposed adjacent said perimeter of said rear window inner surface, said casing having spaced apart forward edges, said casing defining a concave, cross-sectional, rearwardly facing inside surface defining a recess between said casing and said rear window inner surface and adapted to house a plurality of elements, said casing recess provided with periodically-spaced perpendicular-planar panels partitioning the length of said casing recess into multiple individual-lighting units, said lighting units housing lighting elements along with required electrical hardware and reflective elements for each said lighting element, a lens constructed of dimensions allowing a trim fit within and enclosing said casing recess of each said lighting unit without protruding from under said casing edges whereby, said casing edges and lenses are adapted for flush engagement with said rear window inner surface.

2. The apparatus of claim 1 wherein the casing is molded as part of the automobile rear-window frame.

3. The apparatus of claim 1 wherein the casing is separate from the window frame and then attached by metal screws, welding, or like securing means.

4. The apparatus of claim 1 wherein said casing borders the entire rear window of an automobile or similar vehicle.

* * * * *